US008705896B2

(12) United States Patent
Tang et al.

(10) Patent No.: US 8,705,896 B2
(45) Date of Patent: Apr. 22, 2014

(54) PROCESSING A SUPER-RESOLUTION TARGET IMAGE

(75) Inventors: Liang Tang, Beijing (CN); Heng Su, Beijing (CN); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 12/992,857

(22) PCT Filed: Jun. 13, 2008

(86) PCT No.: PCT/CN2008/071287
§ 371 (c)(1),
(2), (4) Date: Jan. 6, 2011

(87) PCT Pub. No.: WO2009/149601
PCT Pub. Date: Dec. 17, 2009

(65) Prior Publication Data
US 2011/0103707 A1    May 5, 2011

(51) Int. Cl.
*G06K 9/32* (2006.01)
(52) U.S. Cl.
USPC .......................................................... 382/299
(58) Field of Classification Search
None
See application file for complete search history.

(56) References Cited

U.S. PATENT DOCUMENTS

| | | | |
|---|---|---|---|
| 6,714,693 B1* | 3/2004 | Miyake | 382/300 |
| 7,116,831 B2* | 10/2006 | Mukerjee et al. | 382/236 |
| 7,616,829 B1* | 11/2009 | Bilbrey et al. | 382/268 |
| 2005/0041842 A1* | 2/2005 | Frakes et al. | 382/128 |
| 2005/0232514 A1* | 10/2005 | Chen | 382/298 |
| 2006/0153472 A1* | 7/2006 | Sakata et al. | 382/255 |
| 2007/0041663 A1 | 2/2007 | Cho et al. | |
| 2007/0189386 A1* | 8/2007 | Imagawa et al. | 375/240.12 |
| 2009/0074328 A1* | 3/2009 | Matsumoto et al. | 382/300 |

FOREIGN PATENT DOCUMENTS

| | | |
|---|---|---|
| CN | 1578449 A | 2/2005 |
| EP | 1811453 A1 | 7/2007 |
| WO | 2008067363 A2 | 6/2008 |

OTHER PUBLICATIONS

Sung Cheol Park; Min Kyu Park; Moon Gi Kang, "Super-resolution image reconstruction: A technical overview", May 2003, IEEE Signal Process. Mag., vol. 20, pp. 21-36.*
Mei Chen, "Dynamic content adaptive super-resolution", 2004, Image Analysis and Recognition, vol. 3212, pp. 220-227.*
Jun-Yong Kim; Rae-Hong Park; Seungjoon Yang, "Super-resolution using POCS-based reconstruction with artifact reduction constraints", (Jul. 12, 2005), Visual Communications and Image Processing, vol. 5960, pp. 596-604.*

(Continued)

*Primary Examiner* — Atiba O Fitzpatrick
*Assistant Examiner* — Carol Wang

(57) ABSTRACT

In a method of processing a super-resolution target image from a plurality of substantially low resolution auxiliary frames, the target image is partitioned into a plurality of adaptively sized blocks, which are sized based upon registration confidence levels of the blocks obtained from information contained in the plurality of auxiliary frames. The blocks are classified into a plurality of different categories according to one or both of their respective registration confidence levels and their respective variance levels. In addition, separate enhancement modes designed to enhance the blocks are selected according to their respective classifications and applied on the blocks to enhance the target image.

11 Claims, 7 Drawing Sheets

(56) References Cited

OTHER PUBLICATIONS

Barreto, D., L. D. Alvarez, R. Molina, A. K. Katsaggelos, and G. M. Callico, "Region-based super-resolution for compression", Multidim. Syst. Sign. Process., Sep. 30, 2007, vol. 18, Nos. 2-3, pp. 59-81. ISSN: 0923-6082(print), 1573-0824(online), DOI:10.1007/s11045-007-0019-y, <http://www.springerlink.com/content/uh865254p8158746/>.

Su, Heng, Liang Tang, Daniel Tretter, and Jie Zhou, "A Practical and adaptive framework for super-resolution", Image processing, 2008. ICIP 2008.15th IEEE International Conference on Publication Date: Oct. 12-15, 2008, pp. 1236-1239, ISSN: 1522-4880/ISBN:978-1-4244-1765-0, DOI: 10.1109/ICIP.2008.4711985, <http://ieeexplore.ieee.org/xpls/abs_all.jsp?isnumber=4711669&arnumber=4711985&count=815&index=315> Current Version Published: Dec. 12, 2008.

Di, Zhang and Ming-hui Du, "Adaptive super-resolution image reconstruction", Computer Engineering and Design, vol. 26, No. 8, Aug. 31, 2005, pp. 2033-2035.

Zhou, Liang and Xiu-chang Zhu, "Super-Resolution Image Restoration Based on Segmentation", Journal of Data Acquisition & Processing, vol. 20, No. 4, Dec. 31, 2005, pp. 398-402.

International Search Report and Written Opinion for PCT Application PCT/CN2008/071287, Mar. 19, 2009.

* cited by examiner

PROCESSING A SUPER-RESOLUTION TARGET IMAGE

The present application is a national stage filing of PCT application number PCT/CN2008/071287, having an international filing date of Jun. 13, 2008, which is incorporated by reference in its entirety.

BACKGROUND

Static images obtained through use of digital still cameras and more recently, cellular telephones equipped with digital cameras, are typically far superior in quality as compared with static images derived from video frames captured through use of digital video recorders. Video frames are typically at relatively lower resolutions as compared with still frames, which results in the relatively lower quality images.

Various signal processing techniques have been applied to improve the quality of static images obtained from video frames. One of these techniques for enhancing resolution in the static images includes single frame-based interpolation. However, conventional interpolation techniques typically result in visual degradation because single frame-based interpolation does not add additional information other than what is contained in the single frame.

Another conventional technique for enhancing resolution is the super-resolution (SR) technique. Under this technique, information from multiple successive frames for the same scene is combined to improve spatial resolution. If sub-pixel displacements have occurred among multiple frames, additional information is available. As such, the subsampled low resolution (LR) frames are combinable to synthesize an image with relatively higher resolution (HR). Generally speaking, SR techniques include two main steps: registering LR images with subpixel accuracy and mapping them to the HR grid and synthesizing the HR target image.

Conventional SR techniques range from direct non-uniform interpolation to Iterative Back Projection (IBP), Projection Onto Convex Sets (POCS), Maximum A Posteriori (MAP), as well as other approaches. Each of these techniques has its own assumptions and hence is restricted in different kinds of imaging environments. For example, MAP techniques get better results where there are suitable prior knowledge, such as, face image SR; iterative techniques fit image area with small registration error, otherwise error could be accumulated during iteration.

Most conventional SR techniques assume that registration is known or can be calculated accurately; however, the accuracy of the registration is of great importance in successfully performing SR tasks. It is generally known that accurate subpixel registration is not always possible due to its ill-posedness, the aperture problem, and the presence of covered and uncovered regions in images.

As such, given several auxiliary frames and a target image, typically, some regions in the target image are registered well, while other regions, such as those regions with relatively complex motion or occlusion, are registered poorly. Well registered auxiliary information generally improves resolution in the target image, while poorly registered auxiliary information is known to degrade the quality of the target image beyond that of the original image. In one regard, therefore, existing SR techniques are often prone to fail when facing a scene with complex motion or occlusion, which often occurs in videos.

A large number of algorithms have been investigated for improving robustness of SR techniques to registration error, such as confidential map, joint estimation of motion vector and HR image, L1 norm replacing L2 norm to reduce effects of outliers, learning the missing high-frequency components of image blocks from training samples, as well as other approaches. Recently, D. Barreto et al., "Region-Based Super-Resolution for Compression, in Multidimensional Systems and Signal Processing", 2007, vol. 18, pp 59-81, proposed to integrate SR techniques into compressing tasks in which they segment blocks of an IBP group into three types before downsampling and encoding procedure. However, the method disclosed therein is designed for compressing video sequence with better quality.

An improved approach to enhancing resolution under the SR technique would therefore be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for processing a super-resolution target image from a plurality of substantially low-resolution auxiliary frames and an image processing apparatus configured to perform the method. The method includes a block-based framework for processing the target image from the auxiliary frames. More particularly, the target image is partitioned into a plurality of adaptively sized blocks based upon image content and the accuracy of motion estimation as identified from data contained in the auxiliary frames. In addition, the different blocks are enhanced with different enhancing techniques suited for the content and accuracy of motion estimation of the blocks.

Through implementation of the process and apparatus disclosed herein, a super-resolution target image may be generated with improved spatial resolution, even in instances where the scene contains an occlusion and/or complex motion. The spatial resolution may be improved because the block-based framework disclosed herein is flexible to different region characteristics of the blocks and is robust to registration errors. In addition, the block-based framework disclosed herein has a natural facility for compressed video super-resolution since it has the facility to involve quantization parameters in super-resolution procedure for quantization noise suppression. Moreover, the block-based framework disclosed herein is also extendible to include different classifications of the blocks and different methods for enhancing the differently classified blocks of the target image.

Figure 1:
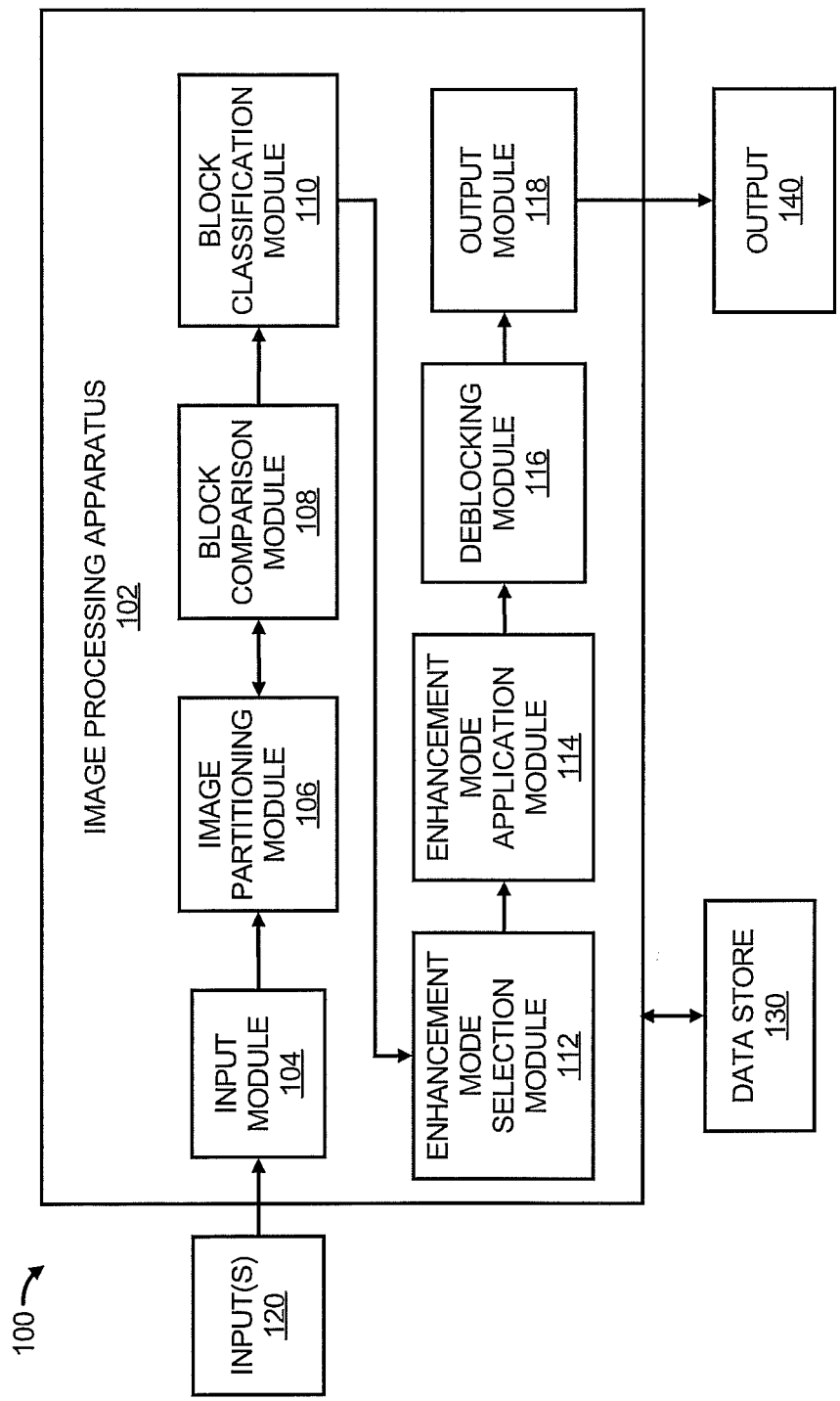
FIG. 1 depicts a simplified block diagram of a system for processing an image, according to an embodiment of the invention.

With reference first to FIG. 1, there is shown a simplified block diagram of a system 100 for processing an image, according to an example. It should be understood that the system 100 may include additional elements and that some of the elements described herein may be removed and/or modified without departing from a scope of the system 100.

As shown, the system 100 includes an image processing apparatus 102, which may comprise software, firmware, or hardware configured to process an image. By way of example, the image processing apparatus 102 may comprise a digital still camera, a digital video camera, a scanner, a computing device, an imaging device, a memory for holding an element, elements in a memory, etc.

Although the image processing apparatus 102 may perform other functions, the image processing apparatus 102 generally operates to process a super-resolution target image from a plurality of substantially low resolution auxiliary frames. In one regard, therefore, the image processing apparatus 102 is configured to generate an enhanced still target image from a plurality of subsampled low resolution auxiliary frames, which may have been captured by a digital video camera.

The image processing apparatus 102 is depicted as including an input module 104, an image partitioning module 106, a block comparison module 108, a block classification module 110, an enhancement mode selection module 112, an enhancement mode application module 114, a deblocking module 116, and an output module 118. In addition, the image processing apparatus 102 is depicted as being connected to one or more inputs 120, a data store 130, and an output 140.

In instances where the image processing apparatus 102 comprises software, the image processing apparatus 102 may be stored on a computer readable storage medium and may be executed by the processor of a computing device (not shown). In these instances, the modules 104-118 may comprise software modules or other programs or algorithms configured to perform the functions described herein below. In instances where the image processing apparatus 102 comprises firmware or hardware, the image processing apparatus 102 may comprise a circuit or other apparatus configured to perform the functions described herein. In these instances, the modules 104-118 may comprise one or more of software modules and hardware modules.

As shown in FIG. 1, the input module 104 is configured to receive data from the input(s) 120. The input(s) 120 may comprise any reasonably suitable input apparatus, such as, a lens and circuitry through which images may be received into the image processing apparatus 102, an image capture device, a data storage device, a computing device, etc. In one regard, the image processing apparatus 102 may receive the plurality of substantially low resolution auxiliary frames from the input(s) 120 through the input module 104. In addition, the input(s) 120 may also be integrated with the image processing apparatus 102.

The input(s) 120 may also comprise any reasonably suitable input device, such as, a keyboard, mouse, external or internal data storage device, etc., through which data may be inputted into the image processing apparatus 102. A user may thus input commands into the image processing apparatus 102 through the input(s) 120.

In any regard, the image processing apparatus 102 may store data received from the input(s) 120 in the data store 130, which may comprise volatile and/or non-volatile memory, such as DRAM, EEPROM, MRAM, flash memory, and the like. In addition, or alternatively, the data store 130 may comprise a device configured to read from and write to a removable media, such as, a floppy disk, a CD-ROM, a DVD-ROM, or other optical or magnetic media. Although the data store 130 is depicted as comprising a component separate from the image processing apparatus 102, the data store 130 may be integrated with the image processing apparatus 102 without departing from a scope of the image processing apparatus 102.

The image partitioning module 106 is configured to partition a target image into a plurality of adaptively sized blocks. An example of a manner in which a target image 210 may be partitioned or divided into a plurality of blocks 220 is depicted in the diagram 200 of FIG. 2. As shown therein, the image partitioning module 106 may divide the target image 210 into blocks 220 having a first size N, such as, 16×16 pixels, otherwise known as macroblocks. Also depicted in FIG. 2 is an enlarged diagram of one of the blocks 220, which shows that the N sized pixel blocks 220 may be divided into blocks A-D having second sizes N/2, such as, 8×8 pixels.

Figure 2:
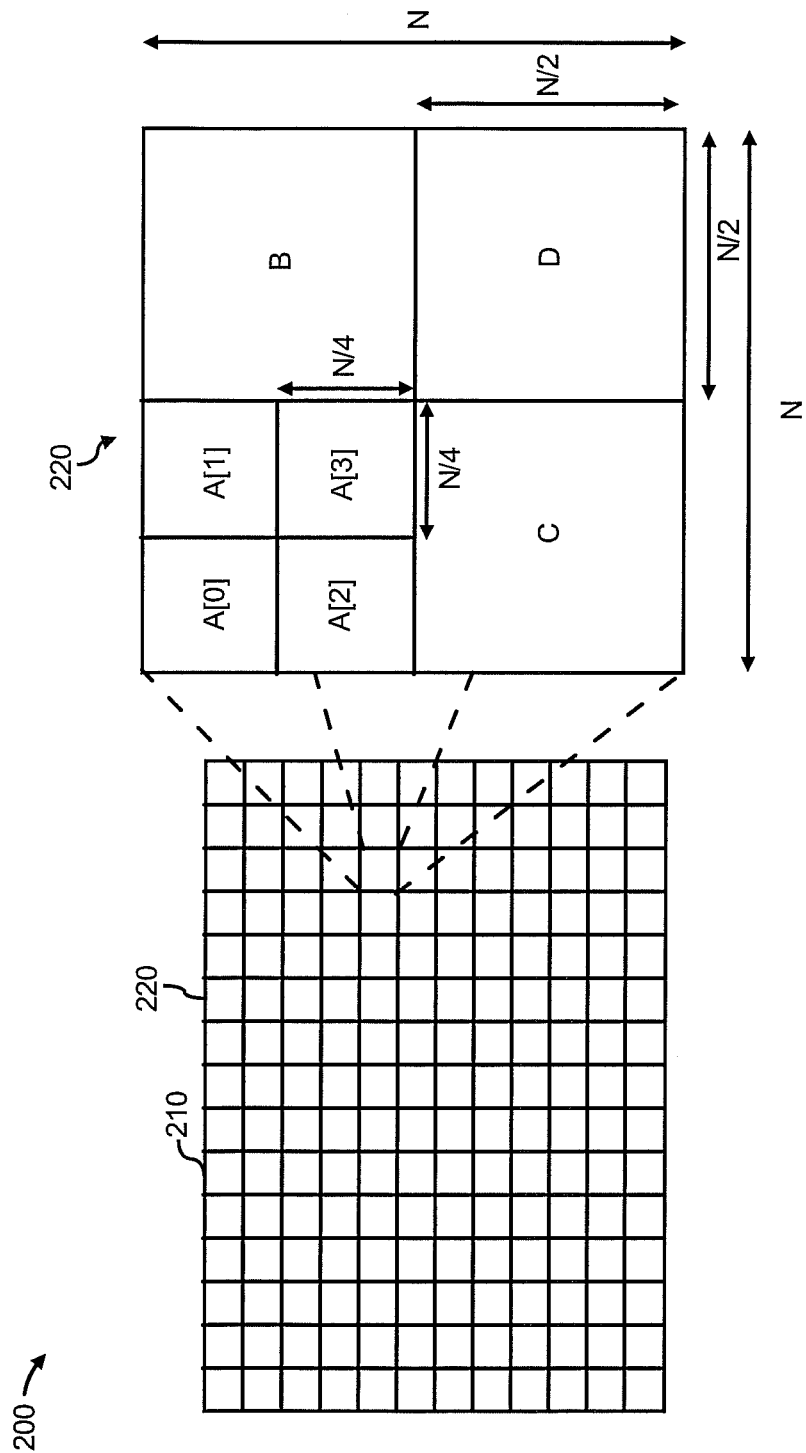
FIG. 2 shows a diagram of a manner in which a target image may be partitioned or divided into a plurality of blocks, according to an embodiment of the invention.

FIG. 2 also shows that the second-sized blocks A-D may be further divided into blocks A[0]-A[3] having third sizes N/4, such as, 4×4 pixels. As such, the second-sized blocks A-D are approximately one-quarter the size of the first-sized blocks and the third-sized blocks A[0]-A[3] are approximately one-quarter the size of the second-sized blocks A-D. Although not shown, the second-sized blocks B-D may also be divided into respective third-sized blocks B[0]-B[3], C[0]-C[3], and D[0]-D[3], similarly to the second-sized block A.

As discussed in greater detail herein below, the image partitioning module 106 may partition different ones of the blocks 220 into the smaller sized blocks depending upon registration confidence levels of the blocks 220, as determined through motion estimation performed on the auxiliary frames.

The block comparison module 108 is configured to determine various characteristics of the data contained in the blocks 220. In one regard, the block comparison module 108 is configured to determine whether the blocks 220 meet predefined characteristic levels. For those blocks 220 that fail to meet the predefined characteristic levels, the block comparison module 108 is configured to forward data to the image partitioning module 106 to further partition the blocks 220. For those blocks 220 that meet the predefined characteristic levels, the block comparison module 108 is configured to forward data to the block classification module 110.

The block classification module 110 is configured to classify the blocks 220 depending upon the data received from the block comparison module 108. More particularly, the block classification module 110 is configured to classify each of the blocks 220 into one of a plurality of different categories depending upon whether the blocks 220 meet various characteristics.

The enhancement mode selection module 112 is configured to select a separate enhancement mode for the blocks 220 according to the classifications the blocks 220 have been assigned by the block classification module 110. More particularly, the enhancement mode selection module 112 is configured to select enhancement modes that have been identified as being particularly effective at enhancing variously classified blocks 220, such as, by enhancing the resolutions of the blocks 220. By way of example, the enhancement mode selection module 112 may select a noise filter to enhance blocks 220 classified as being flat regions.

The enhancement mode application module 114 is configured to apply the selected enhancement modes on the blocks 220 to enhance the target image 210. In addition, the deblocking module 116 is configured to deblock the enhanced blocks 220. Furthermore, the output module 118 is configured to output the enhanced target image 210 to the output 140. The output 140 may comprise, for instance, a display, a printing device, a computing device, a fixed or removable storage device on which the enhanced target image 210 is stored, such as, the data store 130. In the example where the image processing apparatus 102 comprises a digital video camera, the output 140 may comprise a display of the digital video camera. As a further alternative, the output 140 may comprise a connection to a network over which the enhanced target image 210 may be communicated.

Examples of methods in which the system 100 may be employed to process a super-resolution target image from a plurality of substantially lower resolution auxiliary frames, will now be described with respect to the following flow diagrams of the methods 300-500 respectively depicted in FIGS. 3, 4A, 4B, and 5. It should be apparent to those of ordinary skill in the art that other steps may be added or existing steps may be removed, modified or rearranged without departing from the scopes of the methods 300-500.

The descriptions of the methods 300-500 are made with reference to the system 100 illustrated in FIG. 1, and thus makes reference to the elements cited therein. It should, however, be understood that the methods 300-500 are not limited to the elements set forth in the system 100. Instead, it should be understood that the methods 300-500 may be practiced by a system having a different configuration than that set forth in the system 100.

Some or all of the operations set forth in the methods 300-500 may be contained as utilities, programs, or subprograms, in any desired computer accessible medium. In addition, the methods 300-500 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

A controller, such as a processor (not shown), ASIC, microcontroller, etc., may implement or execute the image processing apparatus 102 to perform one or more of the methods 300-500 in processing the super-resolution target image. Alternatively, the image processing apparatus 102 may be configured to operate independently of any other processor or computing device. In any regard, the methods 300-500 may be implemented or executed to generate a super-resolution target image having a relatively high resolution.

Figure 3:
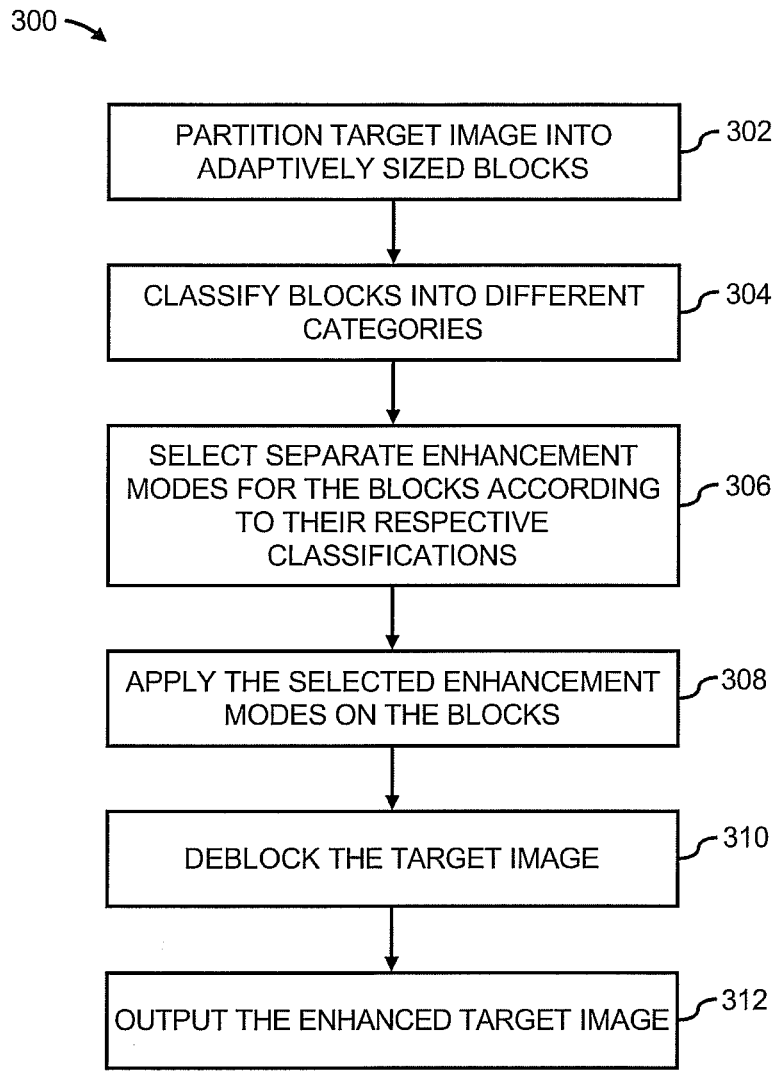
FIG. 3 depicts a flow diagram of a method of processing a super-resolution target image, according to an embodiment of the invention.

With reference first to FIG. 3, there is shown a flow diagram of a method 300 of processing a super-resolution target image, according to an example. At step 302, the image partitioning module 106 partitions the target image into a plurality of adaptively sized blocks 220, for instance, as shown in FIG. 2. The blocks 220 are sized based upon registration confidence levels of the blocks obtained from a plurality of substantially low resolution auxiliary frames, as described in greater detail herein below with respect to the method 400 depicted in FIGS. 4A and 4B.

At step 304, the block classification module 110 classifies the blocks 220 into different categories according to one or both of their respective registration confidence levels and their variance levels. At step 306, the enhancement mode selection module 112 selects separate enhancement modes for the blocks 220 according to their respective classifications. In addition, at step 308, the enhancement mode application module 114 applies the selected enhancement modes on the blocks 220 to enhance the target image.

At step 310, the deblocking module 116 deblocks the target image 210 and at step 312, the output module 118 outputs the enhanced target image.

Figure 4A:
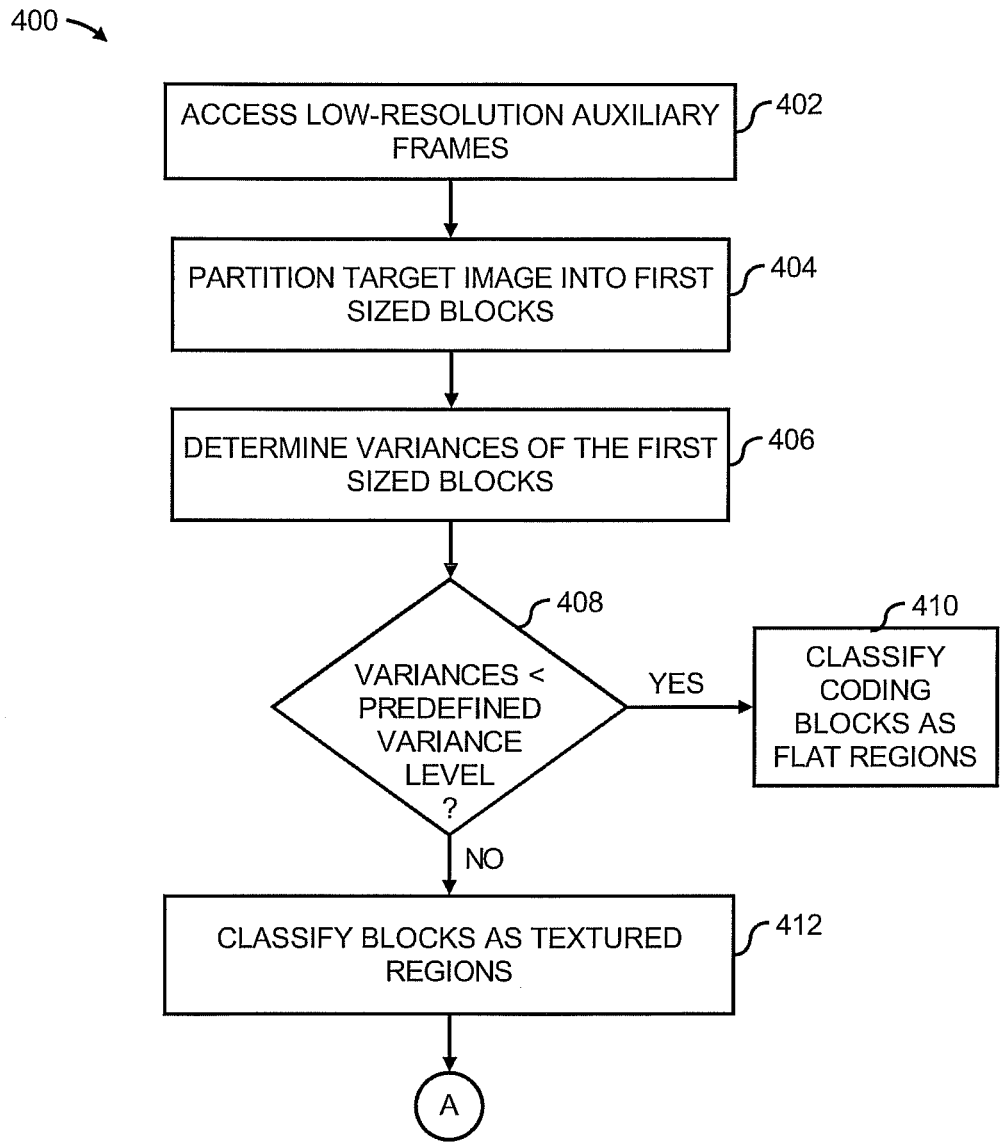
FIGS. 4A and 4B, collectively, show a flow diagram of a method of processing a super-resolution target image from a plurality of substantially low resolution auxiliary frames, according to an embodiment of the invention.
Figure 4B:
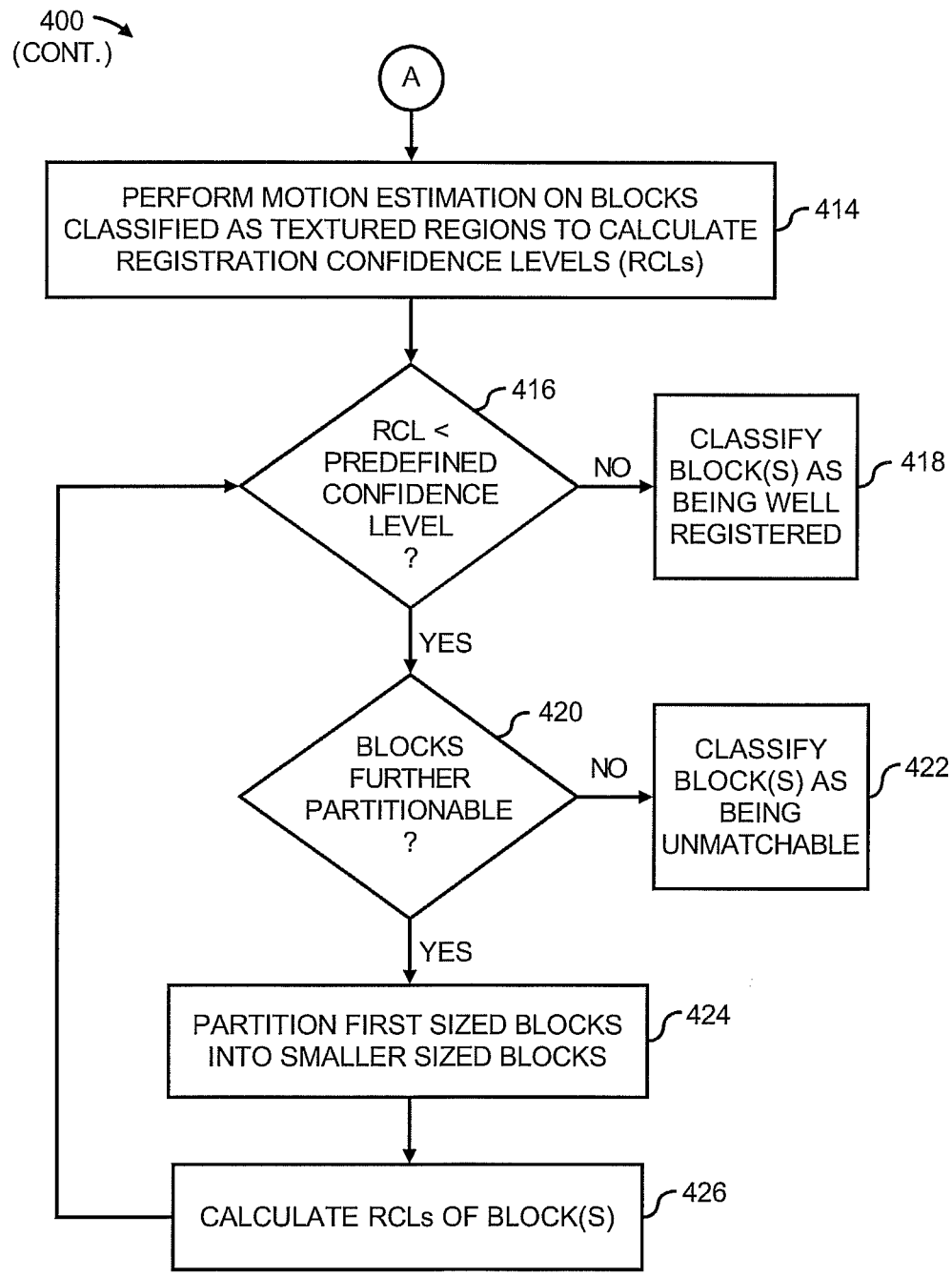

Turning now to FIGS. 4A and 4B, collectively, there is shown a flow diagram of a method 400 of processing a super-resolution target image from a plurality of substantially low resolution auxiliary frames, according to an embodiment. Generally speaking, the method 400 is a more detailed description of steps 302 and 304 of the method 300. More particularly, for instance, the method 400 outlines steps that the image processing apparatus 102 may perform in partitioning the blocks 220 into various sizes and classifying the blocks 220 into different categories.

At step 402, a plurality of substantially low-resolution auxiliary frames are accessed, for instance, from the data store 130. The auxiliary frames may comprise frames of a video image sequence. At step 404, the image partitioning module 106 partitions the target image 210 into a plurality of first sized blocks 220, which may comprise macroblocks, for instance, blocks having 16×16 pixels each.

At step 406, the block comparison module 108 determines variances of the first sized blocks 220. The variances may comprise color variances in the first sized blocks 220. In addition, at step 408, the block comparison module 108 compares the variances of the blocks 220 with a predefined variance level. The predefined variance level may be set based upon any of a plurality of factors.

For those blocks 220 having variances that fall below the predefined variance level, the block classification module 110 classifies those blocks 220 as being flat regions, as indicated at step 410. The flat regions may be defined as those regions that are substantially consistent throughout the subsampled auxiliary frames and thus do not depict relative motion among the auxiliary frames. For those blocks 220 having variances that exceed the predefined variance level, the block classification module 110 classifies those blocks 220 as being textured regions, as indicated at step 412. The textured regions may be considered as those regions having relative motion among the subsampled auxiliary frames.

For those blocks 220 that have been classified as being textured regions, the block comparison module 108 performs a motion estimation operation and calculates registration confidence levels (RCLs) of the blocks 220, as indicated at step 414 (FIG. 4B). The block comparison module 108 may perform the motion estimation operation through any reasonably suitable methods, such as, Optical Flow, Sum of Squared Differences, etc., by comparing values from corresponding pixel locations in the subsampled auxiliary frames. In addition, at step 416, the block comparison module 108 compares the registration confidence levels with a predefined confidence level. The predefined confidence level may be determined empirically and may depend upon the robustness of the selected super-resolution method to registration error.

For those blocks 220 having registration confidence levels exceeding the predefined confidence level, the block classification module 110 classifies those blocks 220 as being well registered, as indicated at step 418. For those blocks 220 having registration confidence levels that fall below the predefined confidence level, the image partitioning module 106 determines whether those blocks 220 are further partitionable at step 420. The blocks 220 may be considered as being further partitionable, for instance, until the blocks 220 reach the A[0]-A[3] sizes (FIG. 2).

The block comparison module 108 classifies those blocks 220 identified as not being further partitionable as being unmatchable, as indicated at step 422.

For those blocks 220 that have been identified as being further partitionable, the image partitioning module 106 partitions the first sized blocks 220 into smaller sized blocks 220, as indicated at step 424. In addition, at step 426, the block comparison module 108 calculates the respective registration confidence levels of the smaller sized blocks 220, for instance, based upon performance of a motion estimation operation at the respective pixel locations of the smaller sized blocks 220 in the auxiliary frames.

Following step 426, steps 416-426 may be repeated to adaptively vary the sizes of the remaining blocks and to classify the remaining blocks 220 as being either well registered at step 418 or being unmatchable at step 422.

Figure 5:
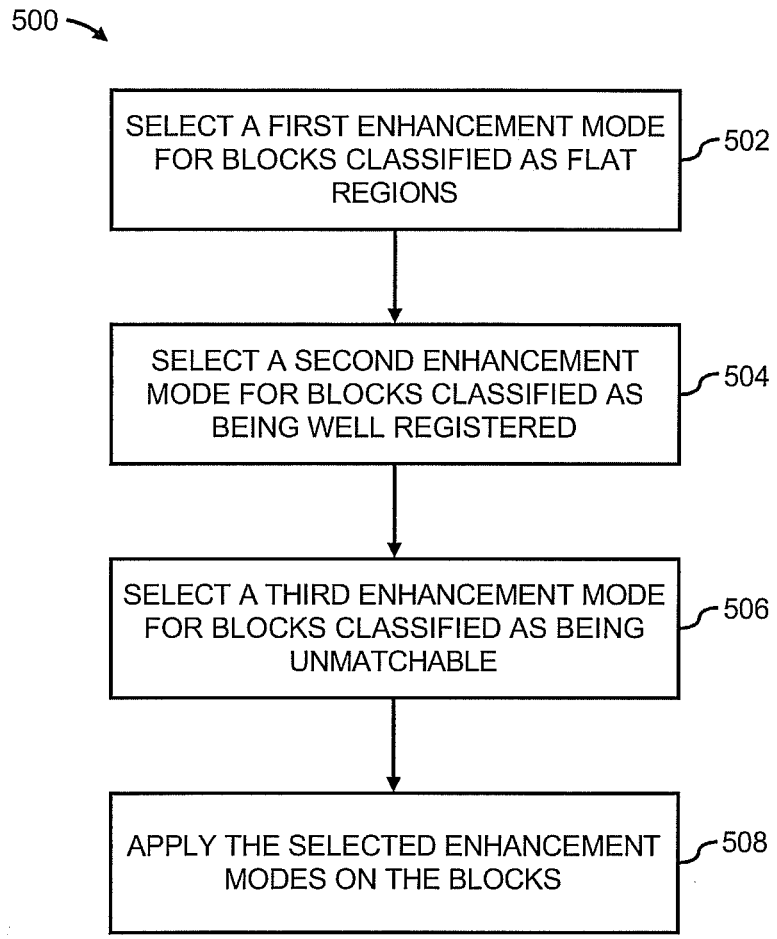
FIG. 5 shows a flow diagram of a method of selecting and applying enhancement modes to the blocks classified through operation of the methods depicted in FIGS. 3, 4A and 4B, according to an embodiment of the invention.

Turning now to FIG. 5, there is shown a flow diagram of a method 500 of selecting and applying enhancement modes to the blocks 220 classified through operation of the methods 300 and 400, according to an embodiment. Generally speaking, the method 500 is a more detailed description of steps 306 and 308 of the method 300. More particularly, for instance, the method 500 outlines steps that may be performed in selecting and applying enhancement modes for the variously classified blocks 220.

At step 502, the enhancement mode selection module 112 selects a first enhancement mode for the blocks 220 that have been classified as flat regions. The first enhancement mode may comprise an enhancement technique that improves the resolution of the blocks 220 classified as flat regions. By way of example, the first enhancement mode may comprise a noise filter.

At step 504, the enhancement mode selection module 112 selects a second enhancement mode for the blocks 220 that have been classified as being well registered. The second enhancement mode may comprise an enhancement technique that improves the resolution of the blocks 220 classified as being well registered. By way of example, the second enhancement mode may comprise a super resolution enhancement mode.

At step 506, the enhancement mode selection module 112 selects a third enhancement mode for the blocks 220 that have been classified as being unmatchable. The third enhancement mode may comprise an enhancement technique that improves the resolution of the blocks 220 classified as being unmatchable. By way of example, the third enhancement mode may comprise a single-frame interpolation mode.

At step 508, the enhancement mode application module 114 applies the selected enhancement modes on the blocks 220.

Although not particularly depicted in FIGS. 4 and 5, the methods 400 and 500 may include additional steps to classify the blocks 220 into other categories, such as, facial regions, textual regions, etc., and to include the selection and application of additional enhancement modes for the other categories of blocks.

Figure 6:
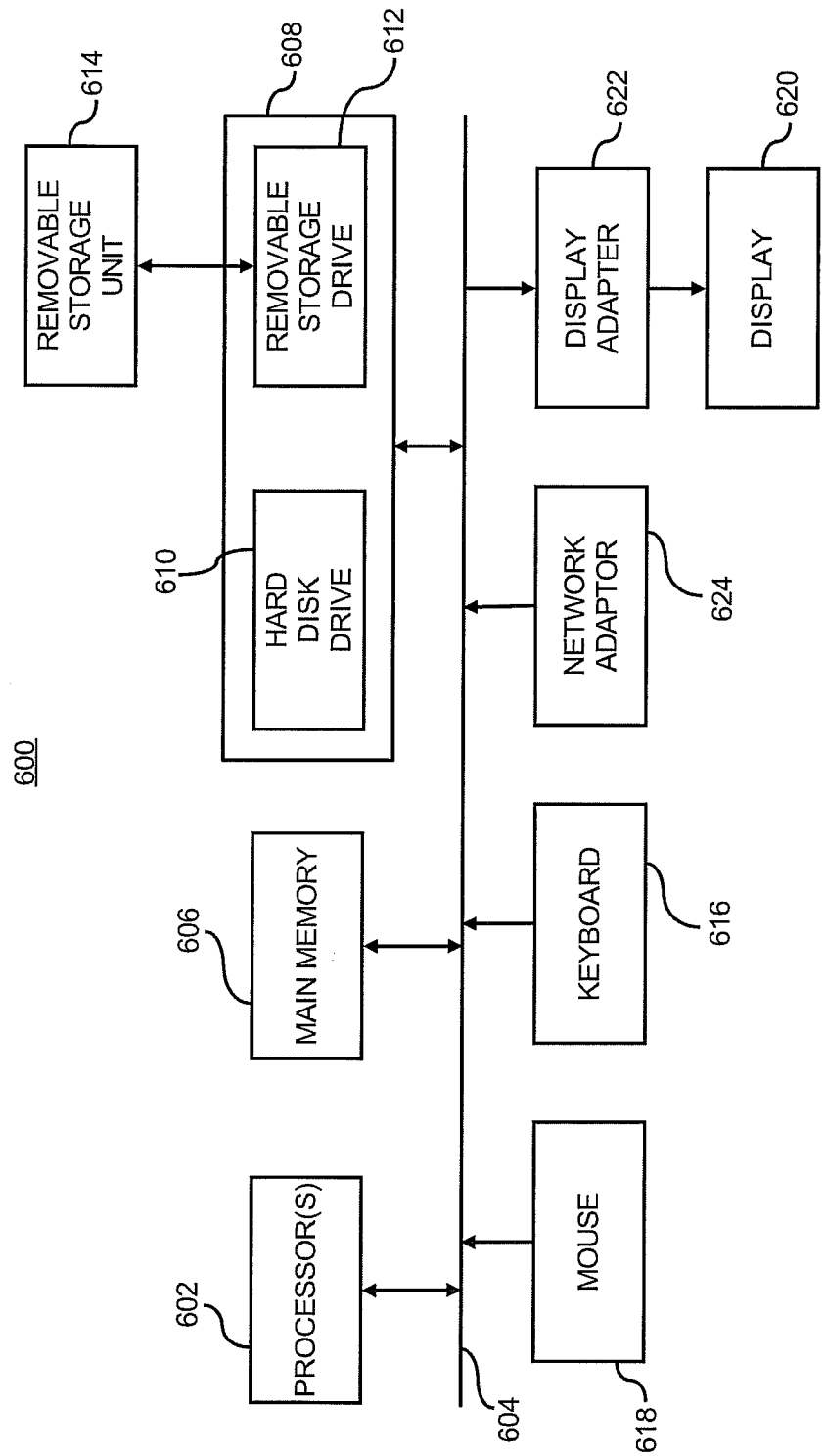
FIG. 6 shows a block diagram of a computing apparatus configured to implement or execute the methods depicted in FIGS. 3-5, according to an embodiment of the invention.

FIG. 6 illustrates a block diagram of a computing apparatus 600 configured to implement or execute the methods 300-500 depicted in FIGS. 2-5, according to an example. In this respect, the computing apparatus 600 may be used as a platform for executing one or more of the functions described hereinabove with respect to the image processing apparatus 102 depicted in FIG. 1.

The computing apparatus 600 includes a processor 602 that may implement or execute some or all of the steps described in the methods 300-500. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for the methods 300-500 may be stored.

The removable storage drive 612 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

It will be apparent to one of ordinary skill in the art that other known electronic components may be added or substituted in the computing apparatus 600. It should also be apparent that one or more of the components depicted in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of processing a target image from a plurality of substantially low resolution auxiliary frames, said method comprising:
    partitioning the target image into a plurality of adaptively sized blocks by:
        partitioning the target image into a plurality of first sized blocks;
        calculating a registration confidence level for each of the first sized blocks;

determining, for each block of the first sized blocks, whether the registration confidence level is below a predetermined registration confidence level; and partitioning each block of the first sized blocks determined to have a registration confidence level below the predetermined registration confidence level into second sized blocks;

classifying the adaptively sized blocks into a plurality of different categories according to one or both of respective registration confidence levels and respective variance levels of the adaptively sized blocks;

selecting separate enhancement modes to enhance the adaptively sized blocks according to the respective classifications of the adaptively sized blocks; and applying the selected enhancement modes on the adaptively sized blocks to enhance the target image.

2. The method according to claim 1, further comprising:

calculating a registration confidence level for each of the second sized blocks, determining whether the registration confidence levels of the second sized blocks fall below the predefined confidence level, wherein partitioning the target image further comprises partitioning the second sized blocks having a registration confidence level below the predefined confidence level into third sized blocks;

calculating a registration confidence level for each of the third sized blocks; and wherein classifying the blocks further comprises classifying the first sized blocks, the second sized blocks, and the third sized blocks according to their respective registrations confidence levels.

3. The method according to claim 1, said method further comprising:

determining the respective variances of the plurality of first sized blocks;

comparing the variances with a predefined variance level; and classifying a first set of blocks having variances below the predefined variance level as flat regions and classifying a second set of blocks having variances above the predefined variance level as textured regions, wherein calculating the registration confidence level for each of the first sized blocks comprises calculating the registration confidence level for each of the second set of blocks.

4. The method according to claim 1, further comprising:

partitioning the second sized blocks having registration confidence levels below the predefined confidence level to smaller sized blocks, calculating registration confidence levels of the smaller sized blocks;

determining whether the registration confidence levels of the smaller sized blocks are below the predefined confidence level;

classifying the smaller sized blocks having registration confidence levels above the predefined confidence level as being well registered; and classifying the smaller sized blocks having registration confidence levels below the predefined confidence level as being unmatchable.

5. The method according to claim 4, wherein selecting separate enhancement modes further comprises selecting a first enhancement mode for the blocks classified as flat regions, selecting a second enhancement mode for the blocks classified as being well registered, and selecting a third enhancement mode for the blocks classified as being unmatchable.

6. The method according claim 5, wherein the first enhancement mode comprises a noise filtering mode, wherein the second enhancement mode comprises a super resolution enhancement mode, and wherein the third enhancement mode comprises a single-frame interpolation mode.

7. The method according to claim 1, further comprising:

deblocking the enhanced target image; and outputting the enhanced target image.

8. An image processing apparatus to generate a target image from a plurality of substantially low resolution auxiliary frames, said apparatus comprising:

a processor; and a memory comprising machine-readable instructions that are to cause the processor to:

partition the target image into a plurality of blocks;

determine variances of the blocks, classify the blocks whose respective variances fall below a predefined variance level as being flat regions, and classify the blocks, whose respective variances exceed the predefined variance level, as being textured regions;

perform a motion estimation operation on the blocks classified as being textured regions using the plurality of substantially low resolution auxiliary frames to calculate registration confidence levels of the blocks;

determine whether the registration confidence levels fall below a predefined confidence level;

classify the blocks whose registration confidence levels exceed the predefined confidence level as being well registered;

partition the blocks classified as textured regions whose confidence levels fall below the predefined confidence level into a plurality of adaptively sized blocks; and apply separate enhancement modes for the blocks classified as being flat regions and the blocks classified as being textured regions according to at least one of the respective variances and the registration confidence levels.

9. The image processing apparatus according to claim 8, wherein to partition the blocks classified as textured regions whose confidence levels fall below the predefined confidence level, the machine readable instructions are further to cause the processor to:

determine whether the blocks whose registration confidence levels fall below the predefined confidence level are further partitionable;

partition those blocks that are further partitionable into smaller sized blocks; and classify those blocks that are not further partitionable as being unmatchable.

10. A non-transitory computer readable storage medium on which is embedded machine-readable instructions, the instructions when executed by a processor, cause the processor to:

partition a target image into a plurality of blocks;

determine variances of the blocks, classify the blocks whose respective variances fall below a predefined variance level as being flat regions, and classify the blocks, whose respective variances exceed the predefined variance level, as being textured regions;

perform a motion estimation operation on the blocks classified as being textured regions using a plurality of substantially low resolution auxiliary frames to calculate registration confidence levels of the blocks;

determine whether the registration confidence levels fall below a predefined confidence level;

classify the blocks whose registration confidence levels exceed the predefined confidence level as being well registered;

partition the blocks classified as textured regions whose confidence levels fall below the predefined confidence level into a plurality of adaptively sized blocks; and apply separate enhancement modes on the blocks classified as being flat regions and the blocks classified as being textured regions according to at least one of the respective variances and the registration confidence levels.

11. The non-transitory computer readable storage medium according to claim 10, wherein the instructions to partition the blocks classified as textured regions whose confidence levels fall below the predefined confidence level are to cause the processor to:

determine whether the blocks whose registration confidence levels fall below the predefined confidence level are further partitionable;

partition those blocks that are further partitionable into smaller sized blocks; and classify those blocks that are not further partitionable as being unmatchable.

\* \* \* \* \*

UNITED STATES PATENT AND TRADEMARK OFFICE
CERTIFICATE OF CORRECTION

PATENT NO. : 8,705,896 B2
APPLICATION NO. : 12/992857
DATED : April 22, 2014
INVENTOR(S) : Liang Tang et al.

Page 1 of 1

It is certified that error appears in the above-identified patent and that said Letters Patent is hereby corrected as shown below:

In the Claims

In column 10, line 1, in Claim 6, after "according" insert -- to --.

Signed and Sealed this
Twelfth Day of August, 2014

Michelle K. Lee
*Deputy Director of the United States Patent and Trademark Office*